United States Patent
Steffens et al.

(10) Patent No.: US 8,418,376 B2
(45) Date of Patent: Apr. 16, 2013

(54) LAUNDRY DRYING DEVICE HAVING A HEAT PUMP

(75) Inventors: Günter Steffens, Dallgow-Döberitz (DE); Andreas Stolze, Falkensee (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 423 days.

(21) Appl. No.: 12/746,545

(22) PCT Filed: Nov. 28, 2008

(86) PCT No.: PCT/EP2008/066427
§ 371 (c)(1),
(2), (4) Date: Jun. 7, 2010

(87) PCT Pub. No.: WO2009/077308
PCT Pub. Date: Jun. 25, 2009

(65) Prior Publication Data
US 2010/0257748 A1 Oct. 14, 2010

(30) Foreign Application Priority Data
Dec. 18, 2007 (DE) .......................... 10 2007 061 041

(51) Int. Cl.
*F26B 21/06* (2006.01)

(52) U.S. Cl.
USPC ........ 34/72; 34/130; 34/595; 34/610; 62/498; 68/18 R; 68/18 F; 8/159

(58) Field of Classification Search ................. 34/60, 68, 34/72, 130, 595, 601, 606, 610; 62/498; 68/4 R, 18 R, 20, 18 F; 8/159
See application file for complete search history.

(56) References Cited

U.S. PATENT DOCUMENTS

| 2,023,534 | A | * | 12/1935 | Mahoney ........................... 261/7 |
| 4,603,489 | A | * | 8/1986 | Goldberg ........................... 34/77 |
| 4,621,438 | A | * | 11/1986 | Lanciaux ........................... 34/77 |
| 7,866,061 | B2 | * | 1/2011 | Tatsumi et al. .................. 34/595 |
| 2005/0072022 | A1 | | 4/2005 | Nagae et al. |
| 2006/0179676 | A1 | * | 8/2006 | Goldberg et al. .................. 34/77 |
| 2007/0039358 | A1 | * | 2/2007 | Mills et al. ..................... 68/18 F |
| 2010/0107703 | A1 | * | 5/2010 | Hisano et al. ..................... 68/20 |
| 2010/0257748 | A1 | * | 10/2010 | Steffens et al. .................... 34/72 |
| 2011/0041260 | A1 | * | 2/2011 | Balinski et al. ................... 8/159 |
| 2011/0209357 | A1 | * | 9/2011 | Ediger et al. .................... 34/595 |
| 2012/0102781 | A1 | * | 5/2012 | Beers et al. ..................... 34/499 |

FOREIGN PATENT DOCUMENTS

| DE | 1827021 | | 2/1961 |
| DE | 3543722 | A1 | 10/1987 |
| DE | 10160788 | A1 | 6/2003 |
| DE | 202007000648 | U1 | 4/2007 |
| DE | 102007061041 | A1 * | 6/2009 |
| EP | 1584734 | A2 | 10/2005 |

* cited by examiner

*Primary Examiner* — Stephen M. Gravini
(74) *Attorney, Agent, or Firm* — James E. Howard; Andre Pallapies

(57) ABSTRACT

A laundry drying device, including a front wall; a seal connected to the front wall; a rear wall; a tub located between the front wall and the rear wall; a rotatable laundry drum arranged in the tub, the rotatable laundry drum being accessible by way of the seal; and a heat pump. The heat pump includes an evaporator that is arranged at least partially between the laundry drum and the rear wall; and a condenser that is arranged at least partially above the laundry drum.

19 Claims, 4 Drawing Sheets

US 8,418,376 B2

LAUNDRY DRYING DEVICE HAVING A HEAT PUMP

BACKGROUND OF THE INVENTION

The invention relates to a laundry drying device having a heat pump.

Fully automatic washer-dryers are known, which are provided with a compression heat pump so as to reduce the energy consumption during the drying process. The configuration comprising water condensation and resistance heating which is traditionally used in fully automatic washer-dryers is essentially replaced here by a closed refrigerant circuit filled with refrigerant comprising a compressor, evaporator, condenser and governor. On account of the restricted available space, only very specific arrangements are possible for the closed refrigerant circuit, without changing the overall device dimensions.

An arrangement of a compact unit for the refrigerant circuit on a base plate, which closes off the housing of the fully automatic washer-dryer towards the bottom, is known for a fully automatic washer-dryer VA-1000 by the Japanese company National. The following disadvantages in terms of energy result here during the drying process:

The air paths from the tub to the heat exchangers (evaporator, condenser) are very long. A precondensation of the warm and damp process air in the drying process results en route from the tub to the evaporator. This precondensation reduces the pump output within the refrigerant circuit, since less water per time unit precipitates out on the evaporator and thus less energy can also be pumped. Further losses develop from the condenser to the air inlet into the drum as a result of heat losses on the channel walls up until entry into the drum.

BRIEF SUMMARY OF THE INVENTION

It is the object of the present invention to reduce an energy consumption of a laundry drying device having a heat pump without increasing its external dimensions.

The laundry drying device (in particular a fully automatic washer-dryer or a separate tumble dryer) has a rotatable laundry drum and a heat pump has at least one compressor, an evaporator, a condenser and a governor. The compressor is arranged at least partially, preferably completely, between the laundry drum and a rear wall. The condenser is also arranged at least partially, preferably completely, above the laundry drum.

This clever arrangement of the evaporator and condenser minimizes energy losses. It provides the process air with a short route from the condenser into the laundry drum. In particular, the spatial vicinity of the evaporator relative to the air outlet out of the drum (air intake opening) produces an improved condensation in the evaporator, which is desirable since a condensation in other regions (e.g. the drum) produces a loss of pump output. Only the phase changeover in the evaporator produces a recovery.

In the event that the laundry drum is surrounded by a drum housing, like for instance in the case of a fully automatic washer-dryer, it is preferable for the evaporator to be arranged at least partially between a drum housing and a rear wall; and for the condenser to be arranged at least partially above the drum housing.

To this end, the evaporator is preferably configured in such a way that process air passes therethrough from the bottom up. This is then particularly preferred if the evaporator is arranged above a process air intake opening in the laundry drum and is connected herewith by way of an upwardly guiding process air duct. A fully automatic washer-dryer herewith prevents water from reaching the heat exchangers (evaporator and condenser) usually provided with aluminum fins, since the arrangement of the evaporator and condenser lies above the normal water level during the washing process. Condensate in the evaporator also unavoidably proceeds downwards into the channel section (return pipe) to the process air intake opening and can thus counteract the "lint deposits" on the fins, since the condensate water carries the lint and other deposits with it downwards.

In order to shorten the path to the laundry drum and/or to the drum housing, it is also advantageous for the condenser to be arranged in a front region of the laundry drying device. This is particularly the case for laundry drying devices with a process air supply opening (or as the case may be, injection opening) into the laundry drum and/or the drum housing in the region of the seal.

It is also advantageous for a compact design for a process air fan to be arranged between the evaporator and the condenser, in particular laterally offset from the condenser.

A further improvement in the energy balance is advantageously achieved by using a laundry drum and/or a drum housing made of plastic, in particular a tub in the case of a fully automatic washer-dryer, namely by means of the thermal insulation improved as a result.

Another further improvement in the energy balance is advantageously achieved by means of providing an insulation (e.g. a layer made of insulating material) of the laundry drum and/or the drum housing, in particular tub, e.g. from the outside.

The above invention can be used particularly advantageously if the laundry drying device is a fully automatic washer-dryer, with the drum housing then corresponding to a tub.

BRIEF DESCRIPTION OF THE DRAWINGS

In the following exemplary embodiment, the heat pump laundry drying device is explained schematically in more detail with the aid of an exemplary embodiment. The same or similarly functioning components are provided with the same reference characters for improved clarity.

DETAILED DESCRIPTION OF EXEMPLARY EMBODIMENTS OF THE PRESENT INVENTION

Figure 4:
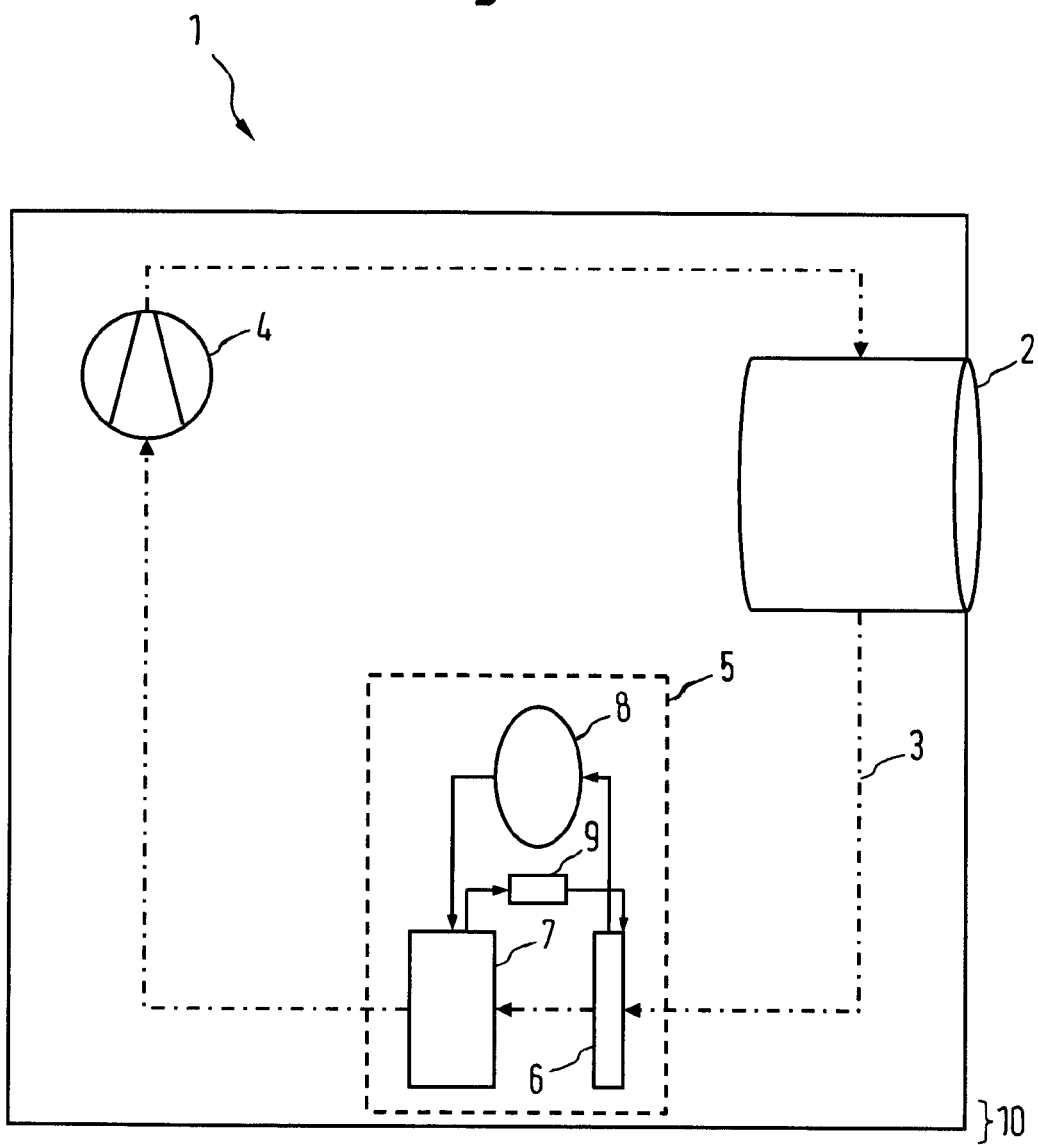
FIG. 4 shows a schematic diagram of a known heat pump laundry drying device.

FIG. 4 shows a schematic illustration of a heat pump-equipped fully automatic washer-dryer 1 as claimed in the prior art, in which a tub 2 having a laundry drum rotatably mounted therein (no FIG.) is connected to a process air duct 3 indicated by the dashed arrows. The process air is moved by means of a fan 4 coupled in the process air duct 3. The process air taken in from the tub 2 during the drying process is dried and heated by means of a heat pump 5 and is then blown back into the tub 2. The effectiveness of a heat pump 5 in a fully automatic washer-dryer 1 is basically known. The heat pump 5 typically comprises an evaporator 6, a condenser 7, a compressor 8 with a cooling fan and a governor 9, which are contained in a closed circuit filled with refrigerant, and is indicated here by the continuous arrows. While the damp process air is cooled in the evaporator 6 and the vapor contained therein is at least partially condensed out, the dry air in the condenser 7 is heated again and blown back into the tub 2. In the embodiment shown, as is known by the Japanese company National, the heat pump 5, as indicated, is arranged as a compact unit for the refrigerant circuit on the base plate 10 of the fully automatic washer-dryer 1. The energy disadvantages already discussed above result here.

Figure 1:
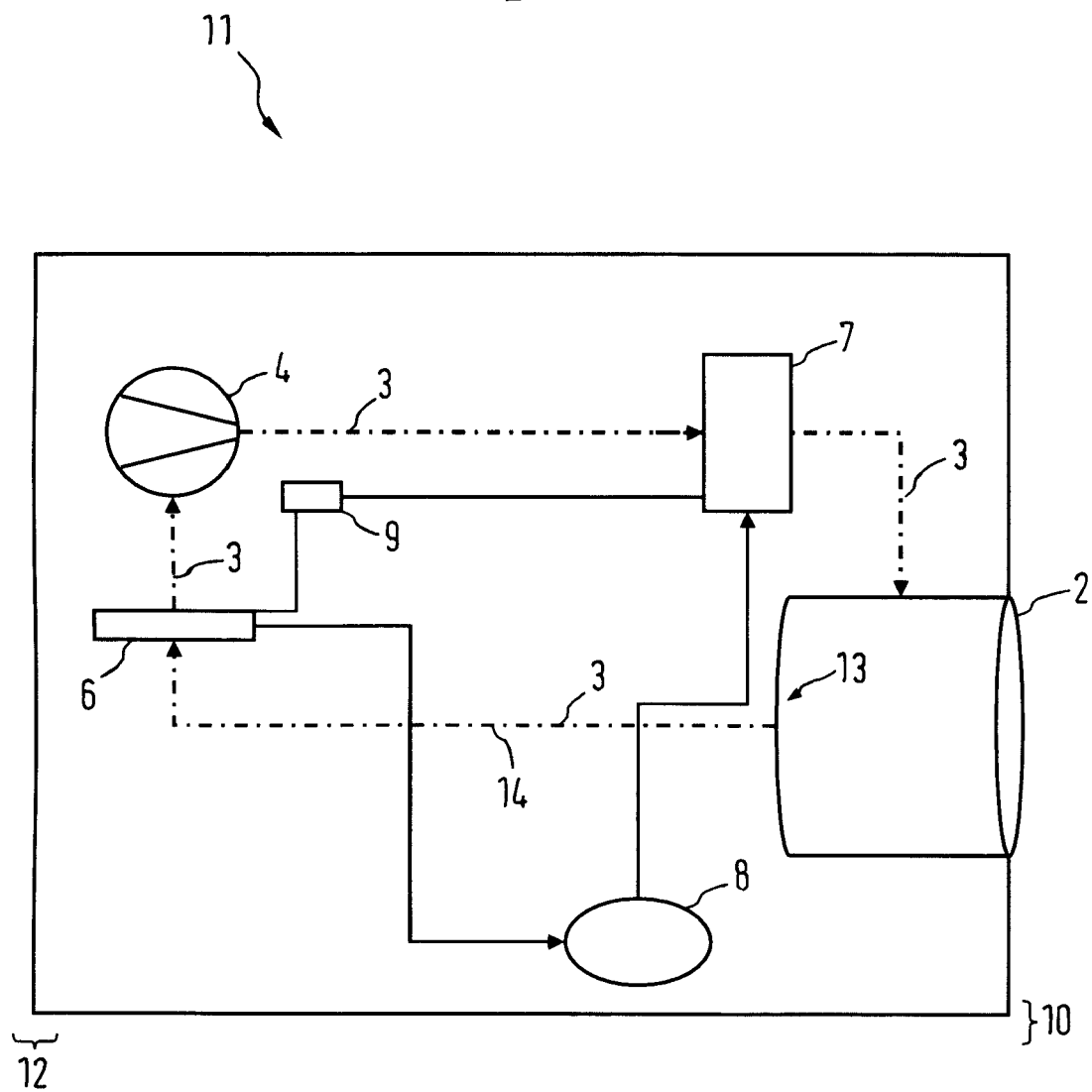
FIG. 1 shows a schematic diagram of an arrangement of components of an inventive heat pump laundry drying device.

FIG. 1 shows an inventive heat pump-equipped fully automatic washer-dryer 11, in which the evaporator 6 is now arranged between the drum housing 2 and a rear wall 12 and the condenser 7 is arranged above the drum housing 2. Only the compressor 8 is still arranged in the region of the base plate 10. The evaporator 6 is configured and arranged so that process air passes therethrough from the bottom up. In particular, the evaporator 6 is arranged above a process air intake opening 13 of the tub 2 and is connected hereto by way of an at least partially upwardly guiding section 14 of the process air duct 3. The condenser 7 is now arranged in a front region of the laundry drying device 11 and the process air fan 4 is arranged between the evaporator 6 and the condenser 7.

Figure 2:
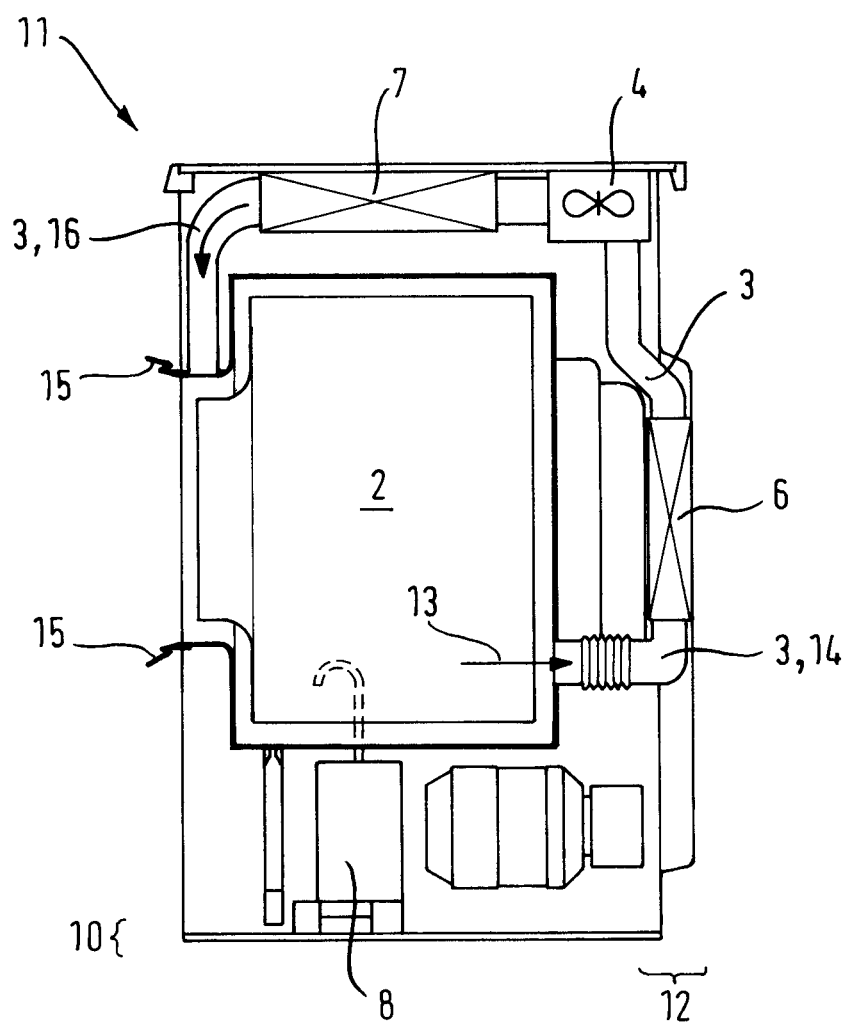
FIG. 2 shows a sectional representation, in the side view, of the heat pump laundry drying device in FIG. 1.

FIG. 2 shows the inventive heat pump-equipped fully automatic washer-dryer 11 in a side view with the evaporator 6 arranged to the rear of the drum housing. A process air duct section 14 proceeds downwards only briefly from the process air intake opening 13 and then upwards into the evaporator, and from there further upwards to the fan 4. The process air is blown forwards by the fan 4 to the condenser 7 and from there briefly to an air injection opening on the upper edge of a seal 15 into the drum housing 2.

Figure 3:
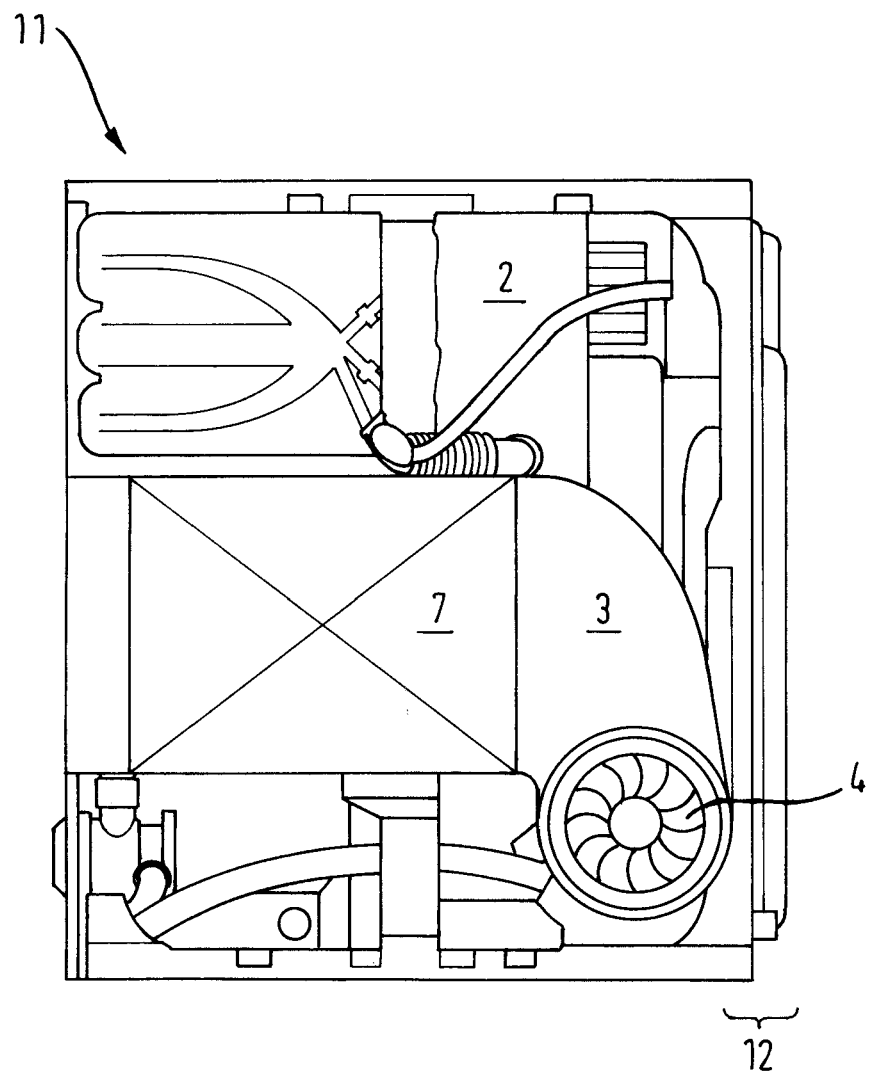
FIG. 3 shows a sectional representation, in the top view, of the heat pump laundry drying device from FIG. 2.

FIG. 3 shows a top view of the position of the process air fan 4, which blows process air into the condenser 7 arranged in a front part via the channel 3. The process air fan 4 is arranged laterally offset from the condenser.

The present invention is naturally not restricted to the described exemplary embodiments. A separate tumble dryer can naturally also be used as a drying device, the laundry drum can be rotatable in the device without any additional housing.

LIST OF REFERENCE CHARACTERS

1 Heat pump-equipped fully automatic dryer
2 Tub
3 Process air duct
4 Process air fan
5 Heat pump
6 Evaporator
7 Condenser
8 Compressor
9 Governor
10 Base plate
11 Heat pump-equipped fully automatic washer-dryer
12 Rear wall
13 Process air intake opening
14 Process air duct section
15 Seal

The invention claimed is:

1. A laundry drying device, comprising:
a front wall;
a seal connected to the front wall;
a rear wall;
a tub located between the front wall and the rear wall;
a rotatable laundry drum arranged in the tub, the rotatable laundry drum being accessible by way of the seal; and
a heat pump, including:
an evaporator arranged at least partially between the rotatable laundry drum and the rear wall; and
a condenser arranged at least partially above the rotatable laundry drum.

2. The laundry drying device of claim 1, wherein the evaporator is arranged at least partially between the tub and the rear wall; and
wherein the condensor is arranged at least partially above the tub.

3. The laundry drying device of claim 1, wherein the evaporator is configured such that process air passes through the evaporator from the bottom up.

4. The laundry drying device of claim 3, further comprising:
a process air intake opening; and
an upwardly leading process air duct;
wherein the evaporator is arranged above the process air intake opening and connected to the process air intake opening by the upwardly leading process air duct.

5. The laundry drying device of claim 1, wherein the laundry drying device has a front region, and wherein the condenser is arranged in the front region of the laundry drying device.

6. The laundry drying device of claim 1, further comprising a process air fan arranged between the evaporator and the condenser.

7. The laundry drying device of claim 6, wherein the process air fan is laterally offset from the evaporator.

8. The laundry drying device of claim 1, wherein at least one of the rotatable laundry drum and the tub includes plastic as a respective base material.

9. The laundry drying device of claim 1, wherein at least one of the rotatable laundry drum and the tub has a respective thermal insulation.

10. The laundry drying device of claim 9, wherein the respective thermal insulation has a respective thermal-insulating layer that at least partially surrounds the at least one of the rotatable laundry drum and the tub.

11. The laundry drying device of claim 1, wherein the laundry drying device is a fully automatic washer-dryer.

12. The laundry drying device of claim 1, further comprising:
a base plate, wherein the front wall and the rear wall extend upward from the base plate, the front wall being disposed directly opposite to the rear wall, and the rotatable laundry drum disposed above the base plate and between the front wall and the rear wall.

13. The laundry drying device of claim 12, wherein the evaporator is physically disposed in a space between an exterior surface of the rotatable laundry drum and an interior surface of the rear wall.

14. The laundry drying device of claim 13, wherein the condenser is physically disposed in a space above an upward facing exterior surface of the rotatable laundry drum, the space above the rotatable laundry drum being on an opposite side of the rotatable laundry drum from the base plate.

15. The laundry drying device of claim 12, wherein the evaporator is completely disposed in a space between an exterior surface of the rotatable laundry drum and an interior surface of the rear wall.

16. The laundry drying device of claim 15, wherein the condenser is completely disposed in a space above an upward facing exterior surface of the rotatable laundry drum, the space above the rotatable laundry drum being on an opposite side of the rotatable laundry drum from the base plate.

17. The laundry drying device of claim 16, wherein the laundry drying device has a front region that is closer to the front wall than the rear wall, and a rear region that is closer to the rear wall than the front wall, and wherein the condenser is disposed in the front region of the laundry drying device.

18. The laundry drying device of claim 12, wherein a flow path of a process air flowing through the evaporator extends in an upward direction flowing away from the base plate.

19. The laundry drying device of claim 12, further comprising a process air fan disposed between the evaporator and the condenser, wherein the process air fan is laterally offset from the evaporator with respect to a plane parallel to the base plate.

* * * * *